July 16, 1968  L. D. THOMAS ET AL  3,393,381
ITERATIVE LIGHT FREQUENCY MODULATOR
Filed Jan. 21, 1965
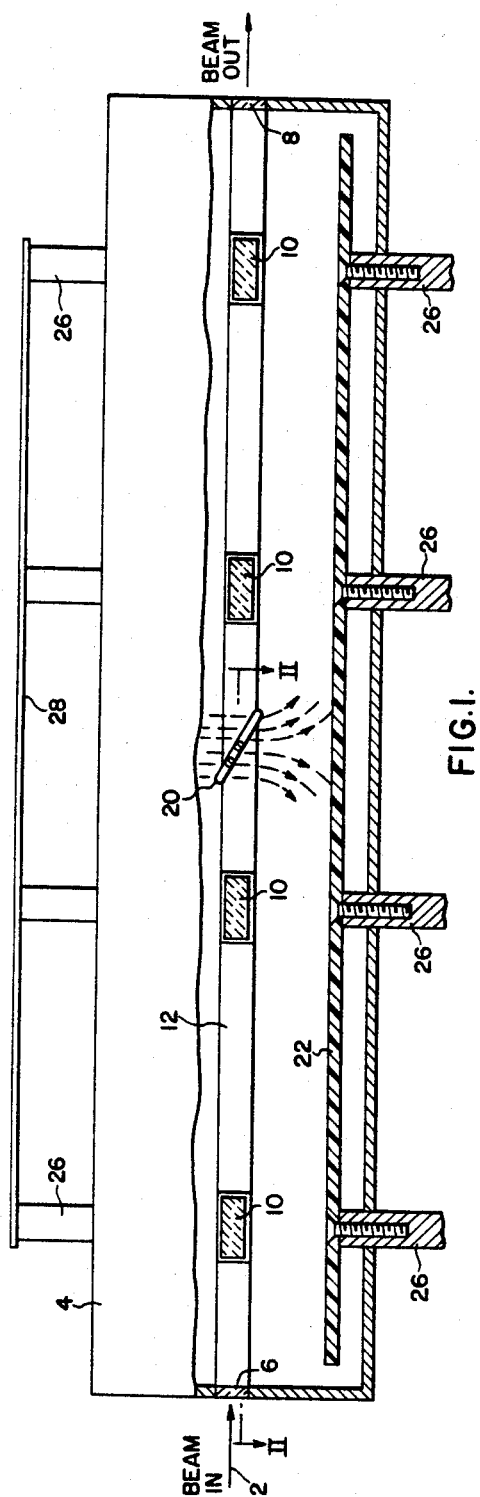
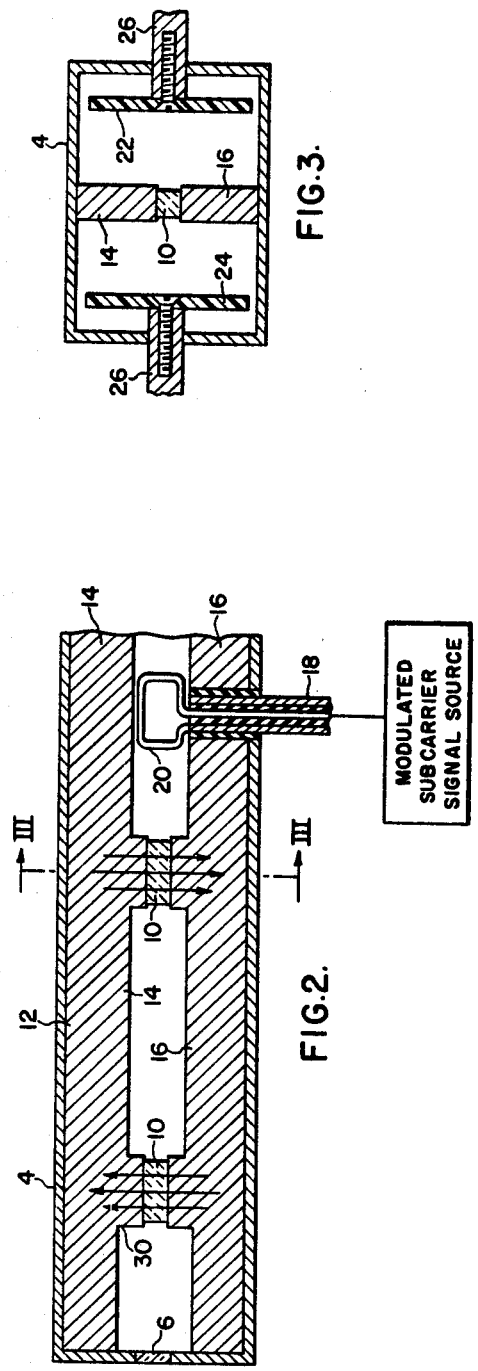
INVENTORS
Leslie D. Thomas
& Michael A. Cross
BY Ernest P. Klipfel
ATTORNEY

United States Patent Office 3,393,381
Patented July 16, 1968

3,393,381
ITERATIVE LIGHT FREQUENCY MODULATOR
Leslie D. Thomas, Catonsville, and Michael A. Cross, West Severna Park, Md., assignors to Westinghouse Electric Corporation, East Pittsburgh, Pa., a corporation of Pennsylvania
Filed Jan. 21, 1965, Ser. No. 426,743
11 Claims. (Cl. 332—26)

ABSTRACT OF THE DISCLOSURE

An iterative light frequency modulator wherein several refracting elements are aligned in a cavity and spaced at one-half wave lengths of a modulating subcarrier frequency. The refracting elements are positioned at antinodes of a standing wave generated in the cavity at the subcarrier frequency. The phase deviation of the light beam produced by the crystals in accordance with the field placed thereon will be additive in effect.

---

The present invention relates generally to light frequency modulators and more particularly relates to structure for modulating a coherent light beam with a subcarrier signal which itself is modulated by an intelligence signal.

Modulation of a light beam may be produced by means of an intelligence signal varying the effective path length through which the light beam travels, as for example by the use of piezoelectric or magnetostrictive materials to mechanically move a mirror in the light path. On the other hand, material placed in the light path may alter the propagation of light in response to an intelligence signal. Suitable materials, such as crystals, may either rotate the plane of polarization of the light beam passing through it or vary its amplitude. The second method is most commonly used since it will in general operate at higher frequencies. However, the modulation index which can be produced in such a modulator is relatively small.

Distortion effects in a light frequency modulator are greatly reduced by applying the intelligence signal, generally in the form of frequency modulation or phase modulation, to a radio frequency subcarrier and then modulating the light beam by the modulated RF subcarrier. Basically such a modulator consists of a crystal or suitable material through which the light beam passes and which has an alternating field at the subcarrier frequency applied to it. If a Pockel's cell is used, for instance, the electric field may be applied transverse to or in the same direction as the light beam along the axis of a suitable crystal. It is advantageous, however, to select a crystal capable of transverse operation since the necessary field to obtain a given depth of modulation can be greatly reduced. The field causes changes in the effective speed of the light through the material by changing its refractive index and consequently produces phase modulation of the lightwave at the subcarrier rate.

As the modulating frequency increases, it becomes increasingly difficult to apply a sufficiently large field across the crystal to obtain the desired variance in refractive index. Also the resistive element of the crystal impedance becomes more important because of increased power dissipation. In other words, the crystal looks like a lower Q dielectric at higher frequencies. With a UHF subcarrier frequency it becomes necessary to mount the crystal in some sort of microwave cavity which is resonant at the subcarrier frequency. The cavity provides convenient impedance transformation and permits location of the crystal in a region of strong electric field. Since the power dissipated in the crystal becomes increasingly important it is necessary to provide a means for conducting away the heat produced. A typical cavity containing a single crystal requires a voltage of 50 volts at the crystal to produce 1° phase shift in the light. Microwave power in the order of 50 to 70 watts at the cavity input is required to produce ±45° peak phase deviation of the light. Not only is this power somewhat expensive to supply, but more importantly it is not possible at this level to dissipate the heat produced by it for CW operation. Therefore, the single crystal unit is not suitable for CW operation at a reasonable communication system deviation or modulation index.

The phase deviation of the light frequency produced by the modulating microwave signal in a given crystal when applied transverse thereto is essentially proportional to the RF voltage across it and its length. The power dissipated by the crystal is essentially proportional to the square of the RF voltage and its length. If therefore one were to make the crystal $n$ times as long, one would need only $1/n$ of the RF power. While there are obvious difficulties in making long crystals, one can build, in accordance with the present invention, a structure consisting of several crystals through which the light passes in turn, all producing additive modulation of the light beam. If one were to use 4 crystals, for example, the input driving power would be reduced by a ratio of 4 to 1. In other words, the total requirements would be reasonable; and even more importantly the power dissipated by each crystal would be only $\frac{1}{16}$ of the original total thereby making heat removal from the crystals for CW operation relatively easy. Removal of heat is important since the usual electro-optic crystals fracture readily with thermal shock. Further, the electro-optic effect is greatly reduced at higher temperatures.

An object of the present invention is to provide apparatus for modulating a coherent light beam requiring less power for a given phase deviation than heretofore available.

Another object of the present invention is to provide a collimated light frequency modulator for CW operation wherein the generated heat can be readily removed.

Another object of the present invention is to provide a phase modulator for a coherent light beam suitable for use with a modulating microwave subcarrier frequency signal.

Another object of the present invention is to provide a light frequency modulator having a phase modulation index larger than heretofore available.

Another object of the present invention is to provide structure for phase modulating a coherent light beam wherein the light beam is modulated in successive steps all producing additive modulation of the beam.

Briefly, these and other objects are attained by aligning in a cavity several refracting elements through which the light passes in turn, all producing additive modulation of the beam. Since the wavelength of the modulating subcarrier is in the order of a foot for, say for example, a thousand megacycles subcarrier signal, it is clear that to place them all so close together that the modulating voltage on each is in the same phase would be impossible. Hence, the elements are spaced in the cavity at a distance equal to ½ wavelength of the subcarrier.

In a preferred embodiment it is highly desirable to concentrate the electric field in the region of the crystals. Therefore a standing wave at the subcarrier is generated in the cavity and each element is positioned at an antinode of the standing wave. By making the velocity of the microwave energy of the standing wave the same as the velocity of the light through the cavity, any point of the light beam will arrive at the next crystal at the same time as the subcarrier excitation. At the half wavelength locations the phase of the modulating voltage will have changed by $\pi$ radians, but because the light beam has also taken a time equal to the half period of the modulating voltage to travel from one crystal to the next, the total modulation will be in phase. The phase deviation of the light beam produced by the crystals will be additive in effect.

Further objects and advantages of the present invention will be readily apparent from the following detailed description taken in conjunction with the drawing in which:

FIG. 1 is a plan view, partly in section, of an illustrative embodiment of the present invention;

FIG. 2 is a partial sectional view taken along the line indicated by the arrows II—II in FIGURE 1; and FIG. 3 is a sectional view taken along the line indiacted by the arrows III—III of FIGURE 2.

A coherent light beam 2 to be modulated may be obtained from a laser, or the like. The beam 2 enters the cavity 4 by an input window 6 and exits at the output window 8. The plurality of field responsive refracting elements 10 are aligned between the input and output ports in the path of the coherent light beam 2. The elements 10 are hereinafter referred to as Pockel's cell crystals although it is to be understood that any field responsive refractive element may be used. A double ridge waveguide 12 having an upper ridge 14 and a lower ridge 16 positions the Pockel's cells 10 in the path of the light beam 2.

Electromagnetic energy is inserted into the cavity 4 through a coaxial input 18 and coupling loop 20. Dash lines designate the magnetic "H" fields which couple symmetrically to the loop 20. Dielectric sheets 22 and 24 are symmetrically disposed one each side of the ridges 14 and 16. Control rods 26, gang-operated at 28, position the sheets 22 nad 24 to correct the phase of the electromagnetic energy, as will be explained more fully hereinafter.

To insure that the crystals 10 all produce in-phase modulation of the light beam as the beam travels from crystal to crystal 10, a standing wave of the electric field at the subcarrier frequency is generated in the cavity 4. The cavity dimensions are chosen, for example, to resonate at a 1000 megacycle subcarrier rate. The crystals are spaced apart at a distance equal to ½ wavelength of the subcarrier frequency. To obtain the maximum refraction of the light beam that each crystal 10 is capable of providing it is desirable to apply maximum electric field to each crystal. Accordingly, a crystal is located at each antinode of the standing wave within the cavity 4 and the waveguide dimensions are chosen to yield a double ridged waveguide of high impedance. A ridge is highly desirable to concentrate the "E" field in the region of the crystals, but the smallest ridge possible is employed to maximize impedance. The use of a double ridge further increases the impedance. Step discontinuity susceptances 30 correct for any crystal mismatch. The RF coupling loop 20 is placed to give best possible symmetry of excitation and is angled to avoid interfering with the path of the light beam 2. It can be seen from FIGURE 2 that the electric field is applied transversely to the long axis of the crystals 10 and the light beam 2. The solid lines represent "E" field maxima with the arrows indicating relative phase at each crystal 10. The field causes changes in the effective speed of the light through each crystal 10 by altering its refractive index and consequently produces phase modulation of the light beam at the subcarrier rate. The upper ridge 14 and lower ridge 16 provides means for dissipating heat from each crystal.

At any given instant therefore the phase of the modulating electric field at the crystals is $\phi$, $\phi+\pi$, $\phi+2\pi$, $\phi+3\pi$, etc. In other words there is a phase reversal between alternate crystals. If however the velocity of the light beam in the cavity 4 is the same as that of the microwave energy, then in the time that the light takes to get from one crystal to the next, that is one-half period of the modulation, the microwave phase at the second crystal will have changed by $\pi$ and will be in phase. The phase deviations produced by the crystals 10 will then be additive to produce with four crystals, for example, four times the deviation produced in each one.

Of course, the crystals 10 are not infinitely short, and the velocity of light in them is less than the constant $c$. Therefore, there will be small changes of phase and amplitude of the modulating electric field relative to modulation of the light beam along the crystal length. Fortunately near the standing wave antinodes the electric field changes slowly with position, and this will therefore produce only a small loss of efficiency, in the order of the few tenths of a decibel. Against this loss of efficiency must be set to the fact that the finite length of the crystals makes their positions much less critical, as far as the RF field is concerned.

It can be seen that to modulate the light beam at a subcarrier frequency would of itself be of no consequence unless an intelligence signal is imposed upon the subcarrier signal. Apparatus for modulating the subcarrier frequency signal has not been illustrated since its location is external to the apparatus for modulating the light beam 2. It is to be understood however that the subcarrier frequency signal may be varied in amplitude, phase, or frequency to vary the refractive index of the crystals 10 in accordance with the intelligence on the subcarrier. The intelligence is placed on the subcarrier which in turn varies the intensity of the "E" field or the angle of the "E" field.

The cavity bandwidth required depends upon the type of modulation applied to the subcarrier, and the modulation index employed. The cavity must be broadband enough to accept all the modulation sidebands without excessive phase distortion. If the intelligence varies the subcarrier frequency by 2 to 5 megacycles per second then the subcarrier, if at a frequency of 1000 megacycles as previously assumed, will vary from 998 to 1002 or 995 to 1005 megacycles per second. This variance in frequency is of little consequence to the dimensions of resonant cavity 4 since the center frequency remains at 1000 megacycles per second. Hence it can be seen that the change of wavelength over the modulating band is small and therefore the crystal positions are not highly critical.

While the velocity of the light beam and microwave radiation in vacuo are the same, they are not necessarily the same in the modulator, due to the refractive index of the cristals 10 retarding the light and due to the dielectric effects in the waveguide. Fortunately, over the rather short length involved (about 6 inches between crystals for a 100 megacycle subcarrier rate), of which only a small part of the path is in the crystal length, the difference is not too large. Only a few decibels loss in sensivity would occur due to deviations produced by each crystal not being in phase with one another. At the same time the deliberate introduction of the dielectric material into the structure and means for adjusting the position of the material will allow tuning of the structure for maximum phase deviation of the light beam. To be sure that the crystals 10 are located at positions where the field "E" is at a maximum, the rods 26 are gang controlled at 28 for sliding the dielectric sheets 22 and 24 back and forth within the waveguide. The rods 26 allow varying the position of the dielectric sheets to change the velocity of the propagation of the microwave energy and thereby allow tuning of the electric field to vary the light beam as it passes through each crystal with a phase reversal between alternate crystals. The dielectric sheets may be of polystyrene or Teflon or any other suitable low loss material.

For maximum efficiency one would like to dissipate as high a proportion of the subcarrier power as possible in the crystals rather than in the waveguide walls to obtain the highest voltage across the crystal for a given level of RF or subcarrier power input. The crystals 10 at 1000 megacycles per second still behave like capacitors with quite high Q, in the order of 1000. The losses in the cavity, coupling loop, dielectric, etc., can be expected to lower the overall effective Q to a value of a few hundred. Therefore it is desirable to utilize an RF bandwidth as small as possible consistent with the need to pass significant sidebands of the RF modulated signal. For wider band applications, the loading of the cavity can be increased by suitable means such as dissipating ferrite material placed within the cavity. Unfortunately the driving power necessary is also then increased. Alternatively, coupled cavities in a manner similar to the use of double tuned circuits at lower frequency, may be utilized to obtain wider bandwidths.

Losses in the cavity, couplings, etc., are difficult to evaluate. However, approximately 15 to 30 watts of RF power is necessary to provide a phase deviation of the light beam of $+45°$ or $-45°$.

While the present invention has been described to a degree of particularity for the purposes of illustration, it is to be understood that all modifications, alterations and substitutions within the spirit and scope of the present invention are herein meant to be included. For example, while Pockel's cells have been shown for the purposes of illustration it is to be understood that any suitable material such as cuprous chloride CuCl, for example may be utilized. The light beam may be generated from any suitable source. The beam however must have temporal coherence which is considerably greater than the phase modulation being produced, for a time equal to or greater than the time taken for the light to travel through the modulator.

We claim as our invention:

1. A microwave structure for modulating a coherent light beam with a subcarrier signal which itself is modulated by an intelligence signal comprising, in combination; means for generating a standing wave at the subcarrier frequency; field responsive means through which the light beam passes disposed at intervals of ½ wavelength of the subcarrier for varying the effective speed of the light beam; and means for applying an alternating field to said field responsive means at the frequency of said modulated subcarrier signal.

2. A microwave structure for modulating a coherent light beam with a subcarrier signal which itself is modulated by an intelligence signal comprising, in combination; means for generating a standing wave at the subcarrier frequency; field responsive means disposed at a plurality of antinodes of said standing wave for varying the effective speed of the coherent light beam as it passes therethrough; and means for applying an alternating field to said field responsive means at the frequency of said modulated subcarrier.

3. A temporal coherent light frequency modulator comprising, in combination; a cavity having input means and output means for the light to pass through said cavity; said cavity being resonant at a predetermined frequency; a plurality of attenuating elements within said cavity aligned in the path of said light; each attenuating element spaced apart substantially a half wavelength of said predetermined frequency; means for exciting said attenuating elements with a field at said predetermined frequency but modulated by an intelligence signal placed thereon to phase modulate the light as it passes through each attenuating element; each attenuating element additively modulating the light as it passes through the plurality of attenuating elements in sequence.

4. A temporal coherent light frequency modulator comprised in combination; the cavity resonant at a predetermined subcarrier frequency and including input means and output means for the light to enter and exit therethrough; a plurality of field responsive crystals for modulating the phase of the light; means for mounting within said cavity said plurality of crystals in the path of said light each separated by a distance substantially equal to ½ the wavelength of said predetermined subcarrier frequency; and means for exciting said crystals with a field at the subcarrier frequency modulated by the intelligence to be transmitted; each crystal additively modulating the temporal coherent light as it passes through the plurality of crystals in sequence.

5. The modulator of claim 4 including dielectric means for adjusting the phase of the subcarrier excitation so that the phase deviation of the light produced by each crystal is in phase with one another.

6. The modulator of claim 4 including dielectric means for delaying the modulating signal to each crystal a time equal to the delay incurred by the light as it passes through each crystal.

7. A microwave structure for phase modulating a coherent light beam with a subcarrier signal which itself is modulated by an intelligence signal comprising, in combination; a microwave cavity resonant at the subcarrier frequency; means for generating a standing wave within said cavity at the subcarrier frequency; input means and output means for the coherent light beam to enter and exit said cavity; a plurality of crystals within said cavity aligned in the path of said coherent light beam; means for locating a crystal at each antinode of the standing wave within said cavity; and means for exciting said crystals with a field of a frequency of the intelligence modulated subcarrier signal to additively modulate the coherent light beam as it passes through the plurality of crystals in sequence.

8. The structure of claim 7 including means for adjusting of the electric field within said cavity to correct the phase of the subcarrier excitation so that the phase deviation produced in said light beam by each crystal is additive in phase.

9. A microwave structure for phase modulating a coherent light beam with a subcarrier signal which itself is modulated by an intelligence signal comprising, in combination; a cavity resonant at the frequency of said subcarrier signal; an input window and an output window for the coherent light beam to enter and exit said cavity; a plurality of field responsive refracting elements; a double ridged waveguide disposed within said cavity for aligning said elements in the path of said light beam with each element spaced apart substantially ½ wavelength of said subcarrier frequency; an RF coupling loop positioned within said cavity and angled to avoid interfering with passage of said light beam through the cavity for exciting said field responsive refracting elements with a field at the intelligence modulated subcarrier frequency; and dielectric sheets symmetrically disposed one on each side of a center ridge formed by said double ridge waveguide for adjusting the phase of said subcarrier field excitation so that the deviation and phase of the light beam passing through each element is additive in phase.

10. A microwave structure for phase modulating a coherent light beam with a subcarrier signal which itself is modulated by an intelligence signal comprising, in combination; a cavity resonant at the frequency of said subcarrier signal; input means and output means for the coherent light beam to enter and exit said cavity; an RF coupling loop angled to avoid interfering with passage of said light beam through the cavity for generating a standing wave field within said cavity at the subcarrier frequency; a plurality of crystals each responsive to the field excitation within said cavity for varying its refractive index; a double ridged waveguide within said cavity and including a central ridge which is aligned with said input means and output means; said waveguide having a plurality of step discontinuities for positioning a crystal at each antinode of the standing wave within said cavity; and a dielectric sheet symmetrically disposed on each side of said central ridge for delaying the excitation to each crystal until the light beam reaches it.

11. The combination of claim 10 wherein the excitation to each crystal is delayed for a time equal to the delay incurred by the light beam as it passes through prior crystals located within said waveguide.

References Cited

UNITED STATES PATENTS

| | | | |
|---|---|---|---|
| 3,304,428 | 2/1967 | Peters | 250—199 |
| 3,330,956 | 7/1967 | Wade | 332—7.51 X |
| 2,856,589 | 10/1958 | Kazan. | |
| 2,964,619 | 12/1960 | Hahn et al. | 350—160 X |

ALFRED L. BRODY, *Primary Examiner.*